United States Patent [19]
Wakefield, II

[11] Patent Number: 5,961,561
[45] Date of Patent: Oct. 5, 1999

[54] METHOD AND APPARATUS FOR REMOTE MAINTENANCE, TROUBLESHOOTING, AND REPAIR OF A MOTORIZED WHEELCHAIR

[75] Inventor: Theodore D. Wakefield, II, Vermilion, Ohio

[73] Assignee: Invacare Corporation, Elyria, Ohio

[21] Appl. No.: 08/911,492

[22] Filed: Aug. 14, 1997

[51] Int. Cl.⁶ .................................................. G06F 7/00
[52] U.S. Cl. ............................ 701/29; 701/24; 701/28; 701/33; 701/36; 180/907
[58] Field of Search ........................... 701/2, 23, 29, 701/36, 24, 28, 33; 180/6.5, 65.8, 907; 370/216, 230, 241, 242

[56] References Cited

U.S. PATENT DOCUMENTS

| | | | |
|---|---|---|---|
| 4,627,860 | 12/1986 | Rowland | 96/111 |
| 5,033,000 | 7/1991 | Littlejohn et al. | 701/36 |
| 5,245,558 | 9/1993 | Hachey | 364/708.1 |
| 5,248,007 | 9/1993 | Watkins et al. | 180/65.8 |
| 5,274,311 | 12/1993 | Littlejohn et al. | 318/562 |
| 5,448,479 | 9/1995 | Kemmer et al. | 701/2 |
| 5,555,949 | 9/1996 | Stallard et al. | 180/6.5 |
| 5,565,856 | 10/1996 | Takaba et al. | 701/29 |
| 5,619,412 | 4/1997 | Hapka | 701/29 |
| 5,704,876 | 1/1998 | Baatz | 482/4 |
| 5,737,711 | 4/1998 | Abe | 701/29 |

*Primary Examiner*—William A. Cuchlinski, Jr.
*Assistant Examiner*—Gertrude Arthur
*Attorney, Agent, or Firm*—Hudak & Shunk Co., L.P.A.; Laura F. Shunk

[57] ABSTRACT

A method and apparatus for the remote maintenance, troubleshooting, and/or repair of electric or motorized wheelchairs is disclosed. A wheelchair diagnostic system includes a data communications network, a motorized wheelchair having a controller associated therewith, a modem coupled between the controller and the data communications network, a remote data processing unit coupled to the data communications network, and a diagnostics tool executing on the remote data processing unit which facilitates communicating with the controller across the data communications network. The diagnostics tool includes computer readable code which causes data from the controller to be downloaded across the data communications network to the remote data processing unit so that a service technician can view error code and drive parameter data for troubleshooting, diagnosing and/or repairing the wheelchair.

16 Claims, 10 Drawing Sheets

FIG.-4

USER DATA | Dealer Database

User Database | New (36) | Delete (38) | Save (40)

Client/User Name | Dealer

Address | Address

Address | Address

City,State,Zip | City,State,Zip

Telephone | Telephone

Chair Info. (Model,Serial,Accessories)

Comments (34)

FIG.-3

VIRTUAL SERVICE STARTUP

Action Virtual Service for MkIV Controls

Select a file that will be used to store the raw data from the chair. Then select Modem or Direct. Click on OK when ready.

Chair File: c:/VSERVE/teds_ct/m4dump.txt 0327797a.txt
040497a.txt
m4dump.txt c:/
vserve
teds_ctl ▼ c:

○ Modem (46)
◉ Direct (48)

OK

Default

Active Communication Port
◉ Com 1  ○ Com 2  ○ Com 3  ○ Com 4

Modem Dialog Window (52)

User Data (32)
Dial (50)
Next Screen (54)

(30)

| DRIVE PARAMETERS MENU 2 | | | | |
|---|---|---|---|---|
| Drive Parameters | 1 | 2 | 3 | 4 |
| Energy Saver —128 | ON ▲ | ON | ON | ON |
| Momentary/Latched Mode —130 | LTCH ▲ | LTCH | LTCH | LTCH |
| Momentary Mode Speed Levels —132 | 1SPD ▲ | 1SPD | 1SPD | 1SPD |
| Standby Mode —134 | ON ▲ | ON | ON | ON |
| Standby Mode with Select —136 | ON ▲ | ON | ON | ON ←126 |
| Remote Drive Select —138 | ON ▲ | ON | ON | ON |
| RIM (3 Axis Control) —140 | ON ▲ | ON | ON | ON |
| Momentary Reverse —142 | ON ▲ | ON | ON | ON |
| Audible Indicator —144 | ON ▲ | ON | ON | ON |
| Latched Mode Type —146 | CRUZ | CRUZ | CRUZ | CRUZ |

Next Screen —148    Previous    Standard Prog

Calibration Screen    Main Menu    Point & Click with mouse to change values.

METHOD AND APPARATUS FOR REMOTE MAINTENANCE, TROUBLESHOOTING, AND REPAIR OF A MOTORIZED WHEELCHAIR

BACKGROUND OF THE INVENTION

The present invention relates to the wheelchair arts. The invention finds particular application in conjunction with the remote maintenance, troubleshooting, and/or repair of electric or motorized wheelchairs and will be described with particular reference thereto. However, it should be appreciated that the present invention may also find application in conjunction with other systems and applications where remote communications for purposes of maintaining, troubleshooting and/or repairing an object or device is desirable.

Control technology has been increasingly incorporated into motorized wheel chairs. It is now standard practice to incorporate controllers in motorized wheelchairs for controlling and monitoring various wheelchair functions such as forward speed, reverse speed, turning speed, acceleration, sensitivity, torque, braking, joystick commands, etc. As a result, the performance characteristics of each motorized wheelchair can be optimized for each user based on various criteria such as the user's desires, the user's physical capabilities, the type of environment or surroundings that the wheelchair will be operated in, etc.

In part for safety considerations, convenience, and flexibility, it is known to provide a wheelchair user with a number of user-selectable performance or drive programs to control the operation of a motorized wheelchair. For instance, if a user is operating a wheelchair in a home or office environment where precise wheelchair control is desired to properly navigate through hallways and doorways, etc., the user may select the appropriate drive program which has all drive parameters optimized for precise control. For instance, the sensitivity of the joystick may be increased and the torque of the drive motors reduced in order to provide more precise joystick control of the wheelchair to facilitate navigating in tight or closed spaces. In other instances, the user may be in an open environment such as a sidewalk, mall, airport, etc. where speed performance is more desirable than precision joystick control. In this instance, the user may select a second drive program which optimizes the wheelchair drive parameters for open driving environments. Drive programs may also be selected for sloped terrains where motor torque parameters are optimized.

Typically, the drive parameters of each wheelchair program are set to standard, nominal, or default values by either the manufacturer, dealer, or service technician. Thus, the user may be provided with a number of standard, pre-programmed, drive programs to select from as the occasion may provide. Typically, each parameter of each drive program can be varied from the nominal or default value in order to accommodate the particular needs of each user. However, the parameters of each drive program can only be modified through a programming device which is directly coupled to an input port associated with the wheelchair controller.

Although programming devices can be purchased from manufacturers/dealers, in most instances, drive parameters are modified by qualified service personnel during service calls to the user, or at dealer repair facilities. In both cases, time, effort, and expenses are incurred in having a technician service (e.g. modify the drive parameters) the wheelchair.

Another result of incorporating controllers into motorized wheelchairs, and thus increasing the complexity thereof, is the potential for increased malfunctions. Malfunctions, whether real or transitory, translate into increased service calls. On-board diagnostics and fault logging are also known. For safety reasons, when an error or fault is detected, the on-board controller typically shuts-down the wheelchair until the wheelchair can be serviced. As with modifying the wheelchair drive parameters, time, effort, and expenses are incurred in having a technician service (e.g. troubleshoot, diagnose, and/or repair) the wheelchair.

Accordingly, it has been considered desirable to develop a new and improved method and apparatus for the remote maintenance, troubleshooting, and/or repair of electric or motorized wheelchairs which meets the above-stated needs and overcomes the foregoing difficulties and others while providing better and more advantageous results.

SUMMARY OF THE INVENTION

In accordance with one aspect of the present invention, a method of remote communication with a motorized wheelchair having a controller associated therewith is disclosed. The method includes establishing a data communications link with the controller, uploading first data from the controller across the data communications link to a remote data processing unit for display on a video monitor, and terminating the data communications link after the controller acknowledges receipt of the second data.

In accordance with a second aspect of the present invention, a wheelchair diagnostic system is disclosed. The wheelchair diagnostic system includes a data communications network, a motorized wheelchair having a controller associated therewith, a modem coupled between the controller and the data communications network, a remote data processing unit coupled to the data communications network, and a diagnostics tool executing on the remote data processing unit which facilitates communicating with the controller across the data communications network, the diagnostics tool including computer readable code means for causing first data from the controller to be downloaded across the data communications network to the remote data processing unit.

In accordance with a third aspect of the present invention, a program product is disclosed. The program product includes a computer usable medium having computer readable program code embodied therein for causing a computer to display first data received across a data communication network from a controller associated with a wheelchair. The computer readable program code in the article of manufacture includes computer readable program code for causing the computer to effect downloading of the first data from a memory associated with the controller, and computer readable program code for causing the computer to effect displaying the first data on a video monitor. The first data includes at least one of error code data and drive parameter data.

One advantage of the present invention is the provision of a diagnostics tool and method which locally, or remotely via a modem, facilitates maintaining, troubleshooting, and repairing an electrical system of a motorized wheelchair.

Another advantage of the present invention is the provision of a diagnostics tool and method which permits wheelchair drive parameters to be viewed, added, deleted and modified locally or from a remote location.

Yet another advantage of the present invention is the provision of a diagnostics tool and method which permits a service technician to remotely or directly view an hour meter and an amp-hour meter of a wheelchair to determine the wheelchair usage.

Still another advantage of the present invention is the provision of a diagnostics tool and method which permits a service technician to remotely or directly determine the condition of the wheelchair batteries.

Still another advantage of the present invention is the provision of a diagnostics tool and method which permits a service technician to remotely or directly inspect a wheelchair fault log for current, intermittent or repetitive problems.

A further advantage of the present invention is the provision of a diagnostics tool and method which permits a service technician to remotely or locally determine all of the connected joysticks and options that are connected to the wheelchair.

Still a further advantage of the present invention is the provision of a diagnostics tool and method which permits a service technician to remotely or locally store user information in a database.

A further advantage of the present invention is the provision of a diagnostics tool and method which permits a service technician to remotely or locally print reports of each troubleshooting, diagnostics and/or programming (TDP) session.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment(s) and are not to be construed as limiting the invention.

FIG. 3 is an exemplary Introduction display screen of the TDP system of FIG. 2;

FIG. 4 is an exemplary User Data display screen of the TDP system of FIG. 2;

FIG. 9 is an exemplary second Drive Parameter display screen of the TDP system of FIG. 2;

DETAILED DESCRIPTION OF THE PREFERRED EMBODIMENT(S)

Figure 1:
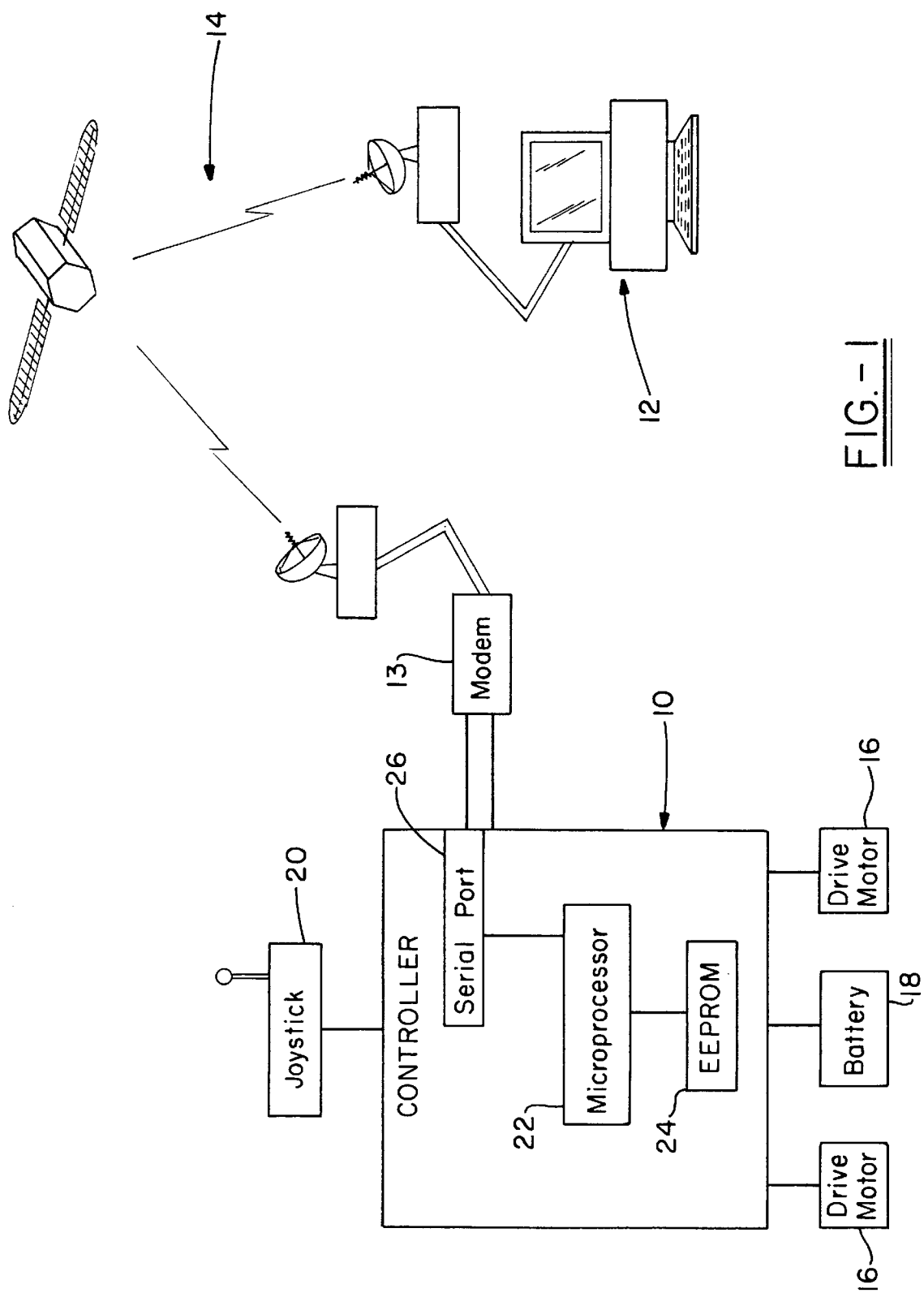
FIG. 1 is a block diagram of an exemplary wheelchair control module coupled to an exemplary computer via a data communications link in accordance with the present invention.

With reference to FIG. 1, an exemplary wheelchair controller or control module 10 is remotely coupled to an exemplary computer 12, such as a personal computer, via a modem 13 and an exemplary digital and/or analog data communications link 14. It is contemplated that the data communications link 14 may be satellite-based (as shown in FIG. 1), microwave-based, Internet-based, telephone line-based, cellular telephone-based, etc., or any combination thereof. The modem 13 may be integrated into the wheelchair or control module 10, or may be a separate stand-alone unit which is removably connected to the wheelchair as described further below.

The controller 10 is associated with a electric or motorized wheelchair (not shown) including one or more drive motors 16, battery(ies) 18, and command module(s) or drive control 20 such as a joystick (as shown) or a RIM head control. The controller 10 includes at least one microprocessor 22 such as a Motorola 68HC11 microprocessor or an X86- or Pentium-based INTEL processor, memory(ies) 24 such as an Electrically Erasable Programmable Read Only Memory (EEPROM), and a serial port 26. It is contemplated that the computer 12 may be directly coupled to the control module 10 through a data cable connected to the serial port 26.

A troubleshooting, diagnostics and programming (TDP) system executes on the computer 12 in accordance with the present invention. Briefly, the TDP system retrieves data stored in the control module 10 via the modem 13 and communications link 14 for display on the computer 12. In particular, the TDP system presents data on the control module 10, joystick 20, motors 16, batteries 18, and other wheelchair options or accessories in a manner that permits correct decision making on the proper path for troubleshooting, diagnosing, repairing, and/or reconfiguring the wheelchair.

As described further below, the TDP system retrieves from the wheelchair fault log data, system configuration data, hour meter data, amp-hour meter data, battery status data, drive performance data, and calibration data for display on the computer 12. In the embodiment being described, all commands can be executed by pointing and clicking with a mouse control (not shown). The keyboard of the computer 12 may be used only for entering user information and initial modem commands.

Figure 2:
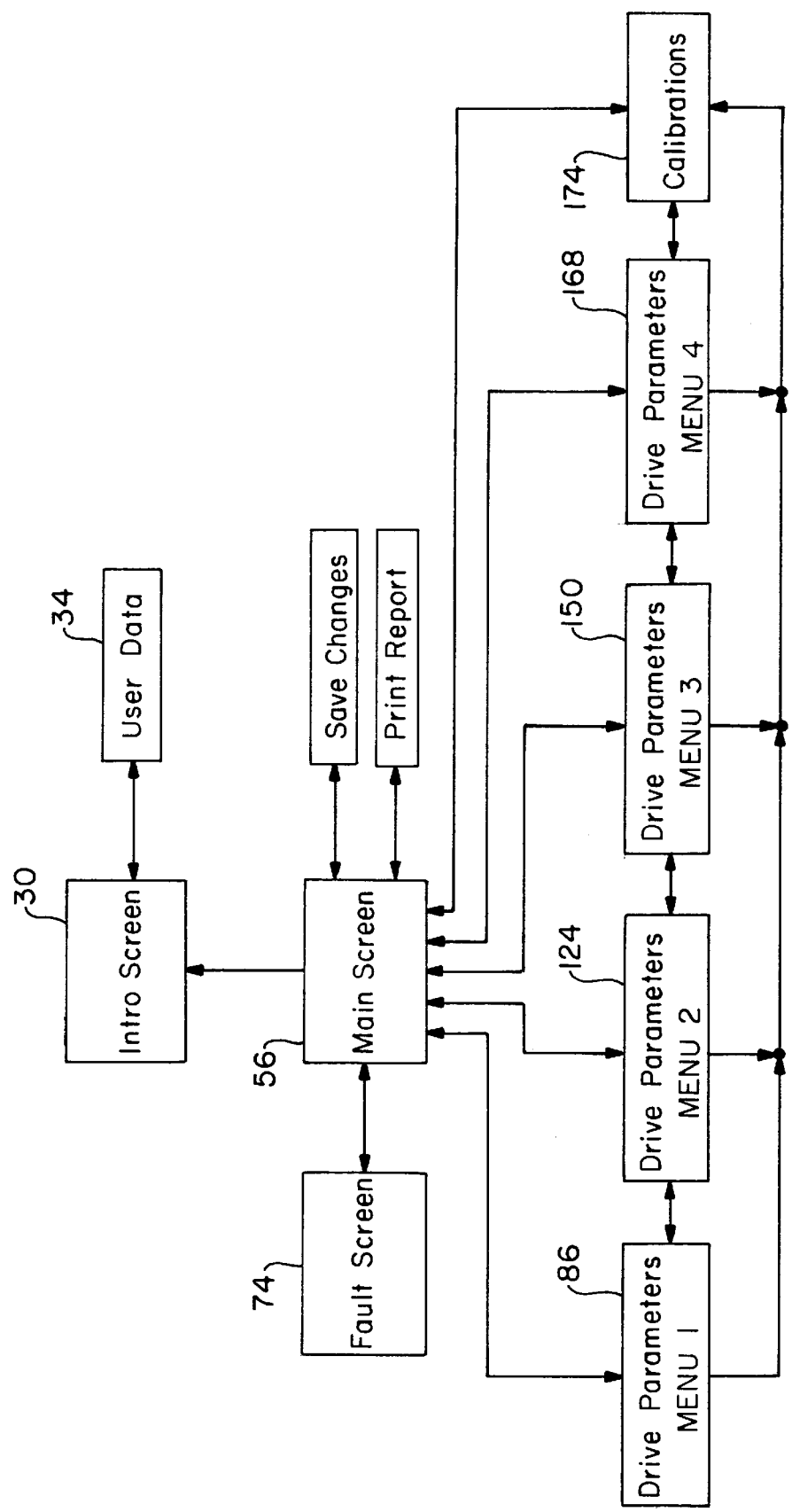
FIG. 2 is a flowchart for a wheelchair troubleshooting, diagnostics and programming (TDP) system that executes on the computer of FIG. 1.

With reference now to FIG. 2, a flowchart for the TDP system is shown. The TDP system may operate under any user interface such as the Microsoft WINDOWS or Apple MACINTOSH interfaces. To facilitate a description of the TDP system, WINDOWS-based display screens will be described. However, it should be appreciated that the TDP system may be executed under any user interface.

A TDP session may be initiated in a conventional manner by selecting (e.g. point and click or through keyboard commands) in a program group to select a TDP system icon. When the TDP system is loaded, an Introduction or Start-up display screen 30 is display on a video monitor associated with the computer 12. An exemplary Introduction screen 30 is shown in FIG. 3. If desired, a window (not shown) may open over the Introduction screen 30 to provide a warning such as:

"PERFORMANCE ADJUSTMENTS SHOULD ONLY BE MADE BY PROFESSIONALS OF THE HEALTH CARE FIELD OR PERSONS FULLY CONVERSANT WITH THIS PROCESS AND THE WHEELCHAIR USER'S CAPABILITIES. INCORRECT SETTINGS COULD CAUSE INJURY TO THE DRIVER, BYSTANDERS OR DAMAGE TO THE CHAIR AND SURROUNDING PROPERTY".

The reader of the message, hereinafter assumed to be a service technician, may then be required to click on an Acknowledge or OK button in order to advance to the introduction screen 30. Once the Introduction display screen is active, the technician may select from an existing data file or create a new file for storing raw data to be downloaded from a wheelchair. It is contemplated that the data file accessed or created may form one or more records of a customer or wheelchair database resident on the computer 12 or elsewhere.

If customer, dealership, and/or wheelchair information (e.g., name, address, telephone number, model number, serial number, installed accessories, comments, etc.) must be entered or modified, a user data button 32 may be selected to display a User Data screen 34 shown in FIG. 4. A New button 36 creates a new record so that new data can be entered into the data fields. A Delete button 38 deletes existing data in the fields. A Save button 40 saves the data once entered into or modified in the fields. The TDP system returns to the Start-up display screen 30 when the User Data display screen 34 is closed.

Figure 5:
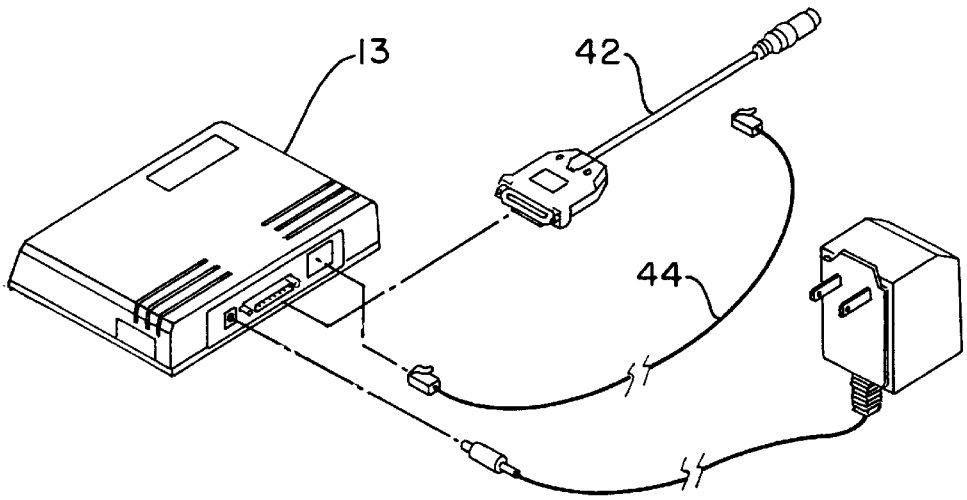
FIG. 5 is an exploded perspective view of the modem connections for establishing the data communications link between the wheelchair control module and the computer of FIG. 1.

It is contemplated that once the TDP system has been initialized (i.e., accessing, opening, and/or updating a data file), a data communications link can then established between the customer and a remote service technician. As shown in FIG. 5, the customer may be instructed to subsequently connect the modem 13 to the serial port 26 with a cable 42, and to connect the modem 13 to a telephone line/wall jack with a phone line 44. The customer may also be instructed to monitor the modem lights (e.g. OH, SD, RD) that indicate when the communications link is established, when data is being downloaded from and/or uploaded to the wheelchair, and when the communications link is terminated.

Referring again to FIG. 3, the particular mode of communication (direct or remote) is chosen by selecting either one of the Modem or Direct buttons 46, 48 on the Start-up display screen 30. The active communication port (Com 1–Com 4) of the computer 12 is also selected. To establish the data communications link, a Dial button 50 on the Start-up display screen 30 is selected. When the connection to the controller 10 is established, a message (e.g."CONNECT 48001") appears in a modem dialog window 52 on the Start-up display screen 30. With the connection established, a Next Screen button 54 may be selected to advance the TDP system to a Main display screen 56.

Figure 6:
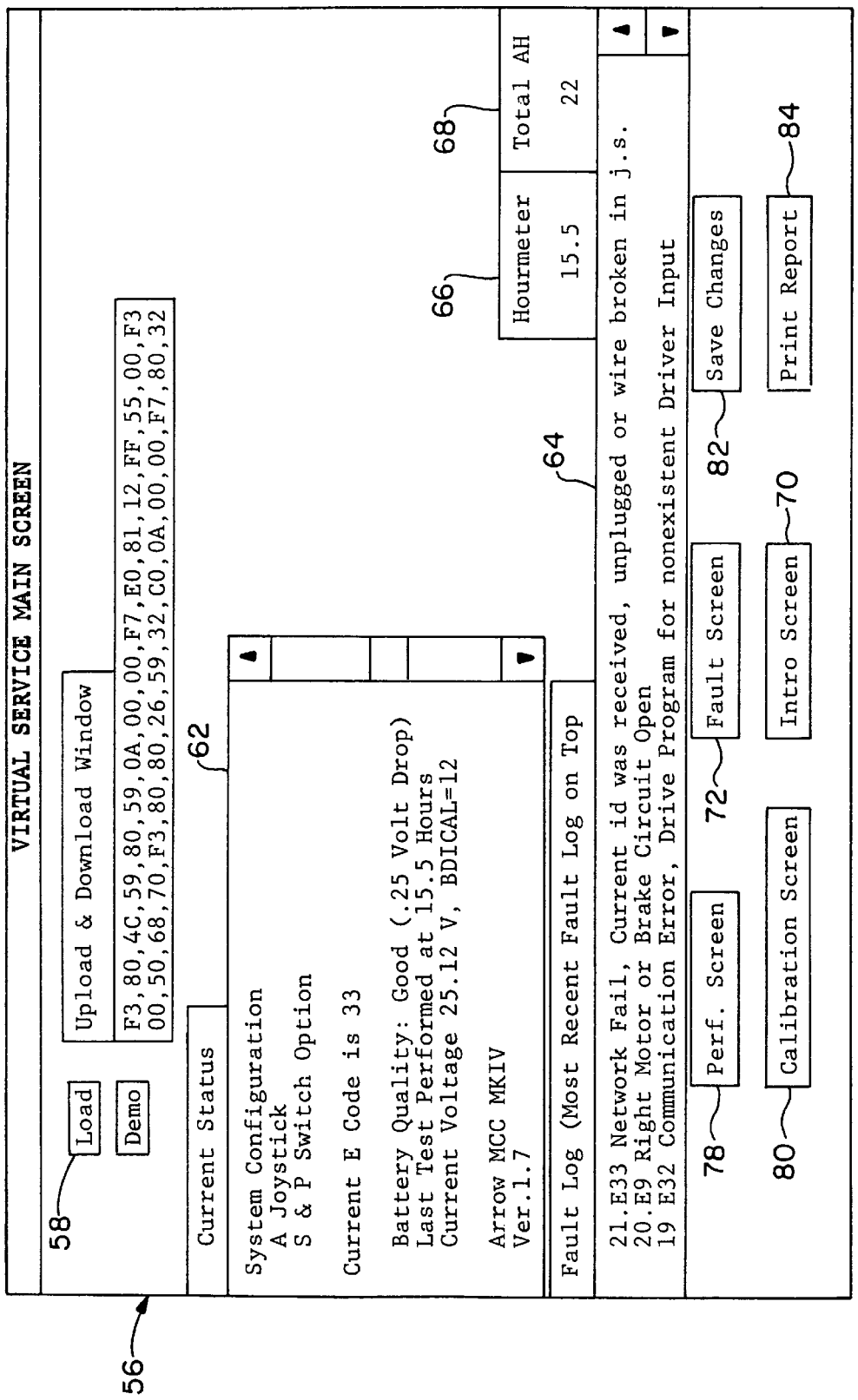
FIG. 6 is an exemplary Main display screen of the TDP system of FIG. 2.

An exemplary Main display screen 56 is shown in FIG. 6. Information from the wheelchair may be downloaded from the EEPROM 24 by selecting a Load button 58. A status window (not shown) may appear over the main screen 56 to indicate what percentage of data has been downloaded to the computer 12. When the indicator or status bar reaches 100%, the wheelchair data has been successfully downloaded, and the status window closes. If the status bar does NOT advance beyond 1% or stops updating during download, a communication problem between the computer 12 and the controller 10 may exist.

An Upload/Download window 60 displays the raw data from the remote wheelchair that has been downloaded into the previously selected/created data file. The raw wheelchair data may be displayed as successive bytes of hexadecimal numbers as shown. A Current Status window 62 displays any options that are configured on the wheelchair such as the type of joystick, Sip and Puff (S & P) switch, etc. Any error codes downloaded from the wheelchair are also displayed in the Current Status window 62, along with battery information (such as battery quality, the hourmeter reading when the last battery test was performed, and the current battery voltage level) and the current revision level of electronics installed in the wheelchair.

A Fault Log window 64 displays a fault log history with the most recent fault listed first. The fault log shows all of the fault codes that have been detected by the TDP system since the controller 10 was built in the factory. The fault log can be used to determine the cause of intermittent faults that are not evident when the wheelchair is being serviced. An Hourmeter window 66 displays the total number of hours that the wheelchair has been used. Likewise, a Total Amp-Hours window 68 displays the total number of amp-hours on the wheelchair.

Figure 7:
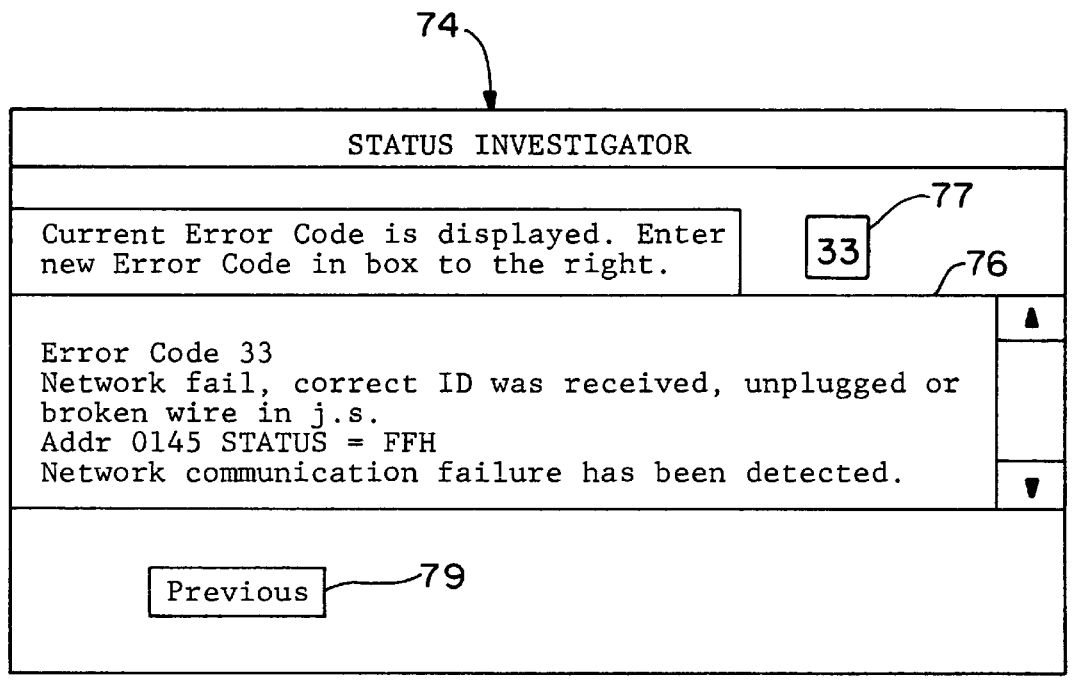
FIG. 7 is an exemplary Fault display screen of the TDP system of FIG. 2.

As shown in FIG. 2, the TDP system can be advanced to a number of different display screens from the Main screen 56. For instance, an Intro Screen button 70 returns the TDP system to the Start-up display screen 30 (FIG. 3). A Fault Screen button 72 advances the TDP system to a Fault display screen 74 shown in FIG. 7. Any current faults or error codes that are listed in the Current Status window 62 (e.g. "Current E Code is 33") can be logged to a Status Investigator window 76 of the Fault display screen 74 by selecting the Fault Screen button 72 on the Main screen 56.

A detailed explanation of the current error code from the Current Status window 62 is displayed in the Status Investigator window 76 to enable a technician to analyze the error code and then take the necessary steps to eliminate the error code (e.g. make the necessary adjustments, order the necessary part, etc.). In particular, the Fault display screen 74 functions as an expert system in that a detailed explanation of the current error code (listed in error code field 77) is provided. Additional troubleshooting and/or diagnostics information relevant to the current error code is also displayed in the Status Investigator window 76. The technician can also review explanation/troubleshooting/diagnostics information for other error codes by entering the desired error code in the error code field 77. The TDP system may be returned to the Main display screen 56 by selecting a Previous button 79.

As described further below, individual drive parameters for each of four different wheelchair drive programs 1 through 4 can be adjusted by selecting a Performance display screen button 78 from the Main display screen 56. Further, calibrations of all the differences from wheelchair to wheelchair can be adjusted by selecting a Calibration display screen button 80 from the Main display screen 56. A Save changes button 82 saves or cancels any changes that have been made to the data fields associated with the Main display screen 56.

A Print Report button 84 advances the TDP system to a Print Option window (not shown) which permits one or more reports to be printed out. For instance, a technician may select from a number of Print options such as PRINT USER/DEALER INFO, PRINT UPLOAD DRIVE SETTINGS, PRINT SAVED DRIVE SETTINGS, and PRINT FAULT LOG.

Figure 8:
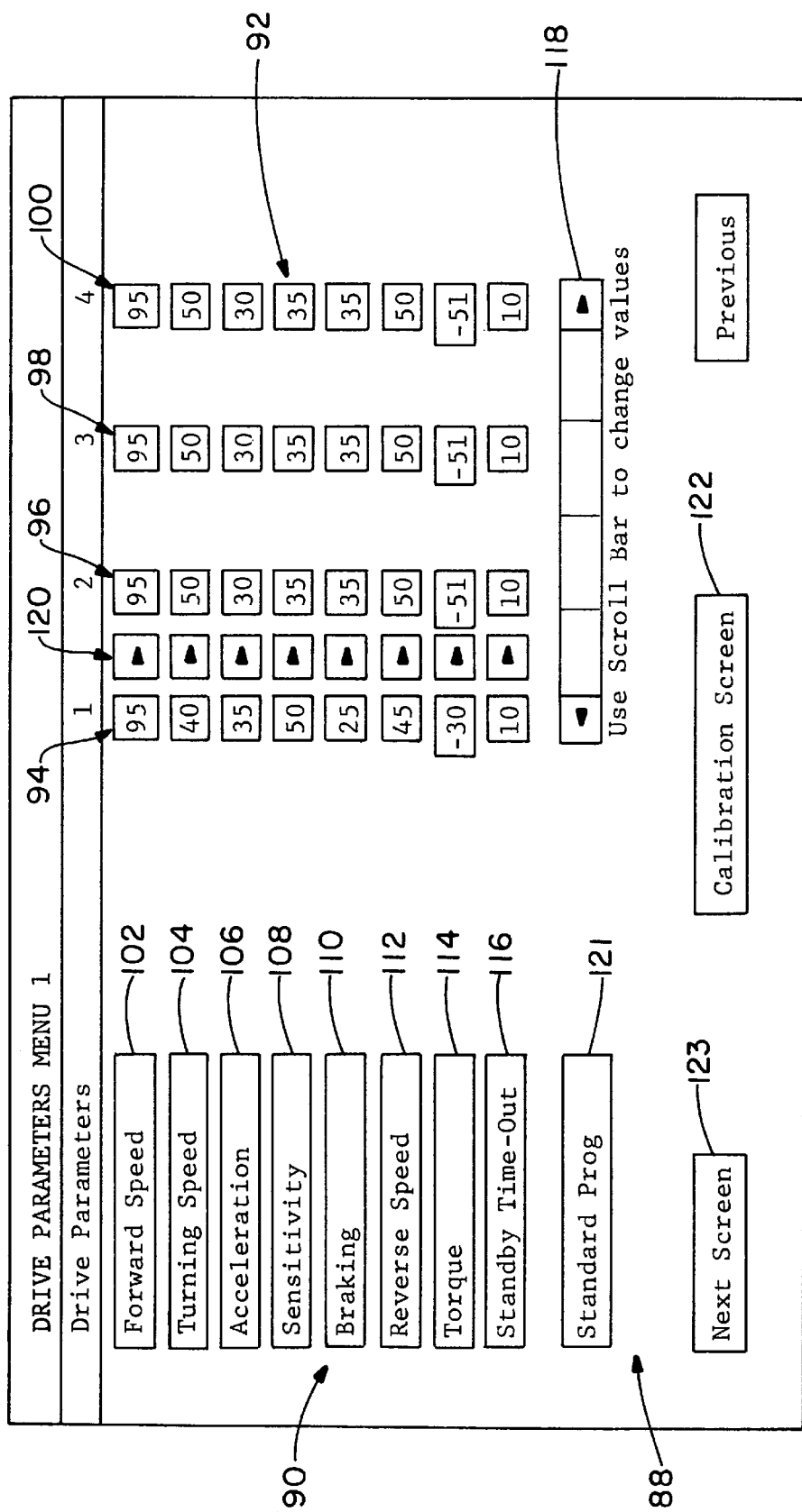
FIG. 8 is an exemplary first Drive Parameter display screen of the TDP system of FIG. 2.

When the Performance display screen button 78 is selected, the TDP system advances to a first Drive Parameter display screen 86 shown in FIG. 8. The first Drive Parameter display screen 86 includes a menu 88 having a plurality of drive parameter description fields 90 and drive parameter setting fields or buttons 92. There are four different drive parameter setting fields 92 for each drive parameter description field 90. A first column 94 of drive parameter setting fields 92 defines a first drive program. Likewise, a second column 96 of drive parameter setting fields 92 defines a second drive program, a third column 98 of drive parameter setting fields 92 defines a third drive program, and a fourth column 100 of drive parameter setting fields 92 defines a fourth drive program.

A Forward Speed parameter 102 sets the maximum forward speed of the wheelchair. The fastest speed setting is 100%. A Turning Speed parameter 104 sets the turning speed of the wheelchair as a percentage of the maximum forward speed. The turning speed is independent of the forward speed setting so that the turning speed can be greater than the forward speed. An Acceleration parameter 106 sets the time that it takes the wheelchair to accelerate to its maximum speed. A value of 100% is the quickest acceleration. A Sensitivity parameter 108 sets the response time to turn commands. A value of 100% is the quickest response to turn commands. A Braking parameter 110 sets the limit on the maximum braking force available to stop the wheelchair. 100% represents the maximum braking capacity of the system. This function is independent of the acceleration setting. A Reverse Speed parameter 112 sets the reverse speed. The reverse speed is independent of the forward speed setting. A 100% value indicates that the reverse speed will be full speed in reverse. A Torque parameter 114 adjusts the stiffness of the response and tracking ability of the wheelchair to joystick commands. A +100 value is the maximum stiffness setting while a −100 value is the maximum softness setting. A Standby Time-out parameter 116 sets the programmed interval of driver control inactivity which must elapse before the control module 10 enters a standby mode. The adjustment range is from two (2) to 120 seconds.

The drive parameter settings 92 for each of the four drive programs 94–100 are adjusted by selecting (point and click or keyboard commands) the desired drive parameter button. Once selected, a scroll bar 118 may be used to change the particular drive parameter value. In addition, an Arrow/Copy button 120 associated with each drive parameter description field 90 may be used to copy the drive parameter value for drive program 1 to drive programs 2 through 4.

A Standard Prog button 121 advances the TDP system to a Standard Program Selection window (not shown) which provides a number of standard drive programs to select from, with each standard drive program having pre-set drive parameter values. A standard drive program can be selected for each of the four drive programs 94–100. The standard drive programs affect the drive parameters displayed in the first, second, and third Drive Parameter display screens 86, 124, and 150 shown in FIGS. 8–10. Exemplary standard drive programs include Standard Proportional Performance, Learner Proportional, Very Slow Proportional, Spasticity Program, Latched Program, Peachtree Performance, New Abilities, Momentary Learner Switch Input, Very Slow Momentary Switch Input, ASL Standard Program, Learner Sip & Puff, Very Slow Sip & Puff, and Learner RIM.

A Calibration Screen button 122 advances the TDP system directly to a Calibration screen 174 discussed further below. A Previous button returns the TDP system back to the Main screen 56. Alternatively, a Next Screen button 123 advances the TDP system to the next display screen in sequential order, namely, a second Drive Parameter display screen 124 shown in FIG. 9 . The second Drive Parameter display screen 124 includes a menu 126 substantially similar to the menu 88 of the first Drive Parameter display screen 86.

An Energy Saver parameter 128 extends the driving range of the wheelchair by reducing the maximum power output capability of the control module 10 by one-third. The energy saver feature should be selected when range is more important than providing the full power capability. It should also be selected for wheelchairs operated very slowly, or for child-sized wheelchairs.

A Momentary/Latched Mode parameter 130 determines the mode for driving commands. In Momentary mode, drive commands are active only as long as a drive command is given. With proportional control joystick, the speed of the wheelchair varies with the amount of joystick deflection. With a switch type of drive control, there is one speed in each direction and the selection of either one speed level or three speed levels may be indicated by a rate of flashing of a level indicator (not shown), or by an LCD display (not shown) associated with the command module 20. A first or low speed is indicated by no flashing. A second or medium speed is indicated by low-level flashing. A third or fastest speed is indicated by high-level flashing. A Momentary Mode Speed Level parameter 132 provides the selection between one or three speeds in Momentary mode.

In Latched mode, forward commands from the command module 20 (either proportional or switch type) are held active even though the driver may have released the control. Reverse commands may be either momentary or latched. Left and right commands are momentary. Latched commands are canceled by giving a command in the opposite direction.

A Standby Mode parameter 134 permits the wheelchair to enter an inactive or standby mode after a programmed time period of no activity from the command module. The standby mode may be indicated by a rapidly flashing mode indicator (not shown), or by an LCD display associated with the command module 20, and by providing a very long tone from a beeper (not shown). Activating an Emergency Stop (Reset) switch (not shown) returns the wheelchair to the previously active mode and give the appropriate visual and audible indication. The delay time before entering the standby mode may be set with the Standby Time-Out drive parameter 116 on the first Drive Parameter display screen 86.

A Standby Mode With Select parameter 136 provides the ability to select operating modes without the use of the Emergency Stop (Reset) switch. The standby mode is entered after a programmed time of inactivity from the drive control 20. The standby mode is indicated by flashing the mode indicator rapidly and giving a very long tone from the beeper. The delay time before entering the standby mode is set by the Standby Time function. The operating mode is changed by moving the joystick in the direction of the desired mode and returning the joystick to neutral. Only those modes previously activated through a keypad may be selected. Drive commands select the activated operating modes in the following manner: forward activates Driver mode, right activates Remote Drive Selection mode, and left activates ECU/Recline Selection mode.

The mode and level indicators show the mode selected. One second after the drive control 20 is returned to neutral the selected operating mode becomes active. The Emergency Stop (Reset) switch may be used to enter the standby mode (except when RIM or 3-speeds in Momentary mode is selected) without having to wait for the programmed inactive period to elapse. With RIM controls the Emergency Stop switch allows the reverse direction to be selected. The Emergency Stop (Reset) advances the speed level when in drive mode and 3-speeds in Momentary mode is active.

A Remote Drive Select parameter 138 permits one of the four drive programs 94–100 to be selected through the drive control 20. When enabled a drive select toggle switch is still active. The Remote Drive Selection mode is entered from the Drive mode by activating the Emergency Stop (Reset) switch. The mode indicator flashes at a one second rate and if active, the audible indicator will provide three short beeps. The joystick position, either switch-type or proportional will advance the drive program selector and light the appropriate drive indicator. That is, deflecting the joystick to the left advances to the next higher drive program (e.g. from program 94 to program 96). The Remote Drive Selection mode may be exited by activating the Emergency Stop (Reset) switch.

A RIM Control parameter 140 activates a 3-quadrant driving program for use with any driver input including S&P, hand-operated joysticks, etc. It is usually used as a special proportional/switch control program for use with a headrest mounted RIM joystick. The forward and reverse functions of the drive control 20 are inverted when selected with Emergency Stop (Reset) switch activated. In the normal mode, pushing the joystick forward or the forward switch causes the wheelchair to move forward. In the reverse mode, pushing the joystick forward or the forward switch causes the wheelchair to move backward. The reverse mode is indicated by turning on the mode and level indicators. In normal operation only, the mode indicator will be on. The audible indicator will beep on and off continuously to indicate reverse mode.

A Momentary Reverse parameter 142 provides a selection between Latched mode or Momentary mode in reverse.

An Audible Indicator parameter 144 enables the audible indicator option if installed in the drive control 20. When activated, the beeper sounds to indicate control module mode and level changes. The beeper code is two short beeps for Drive Mode active, one short beep for Drive level advanced to the next higher level, one long beep for ECU ONE outputs or Recliner active, two long beeps for ECU TWO outputs active, one very long beep for Standby mode chair beep inactive, three short beeps for Remote Drive, selection mode active, and a continuous tone for Reverse activated (RIM only).

A Latched Mode Type parameter 146 provides a choice of four latched speed modes which can be selected. In 5 SPEEDS mode there are five latched forward speeds which are successively engaged by repeatedly giving forward commands. There is one reverse speed. In 3 SPEEDS mode, there are three forward speeds and one reverse speed. In 1 SPEED mode, there is one forward speed and one reverse speed. In CRUISE CTL. (Cruise Control), the forward speed increases in proportion to the length of time that the forward command is maintained in the activated condition.

For example, if the Forward command is given in short bursts, the speed will increase in proportionally short bursts. The speed will hold at the maximum level achieved at the end of each burst. If the Forward command is maintained in the activated condition, the speed will continue to increase until either maximum is achieved or until the Forward command is released. The speed will hold at the maximum level achieved at the release of the Forward command. When given a reverse command, the speed decreases at the same rate. Two reverse commands within one second stops the wheelchair. In reverse, a single forward command stops the wheelchair.

Figure 10:
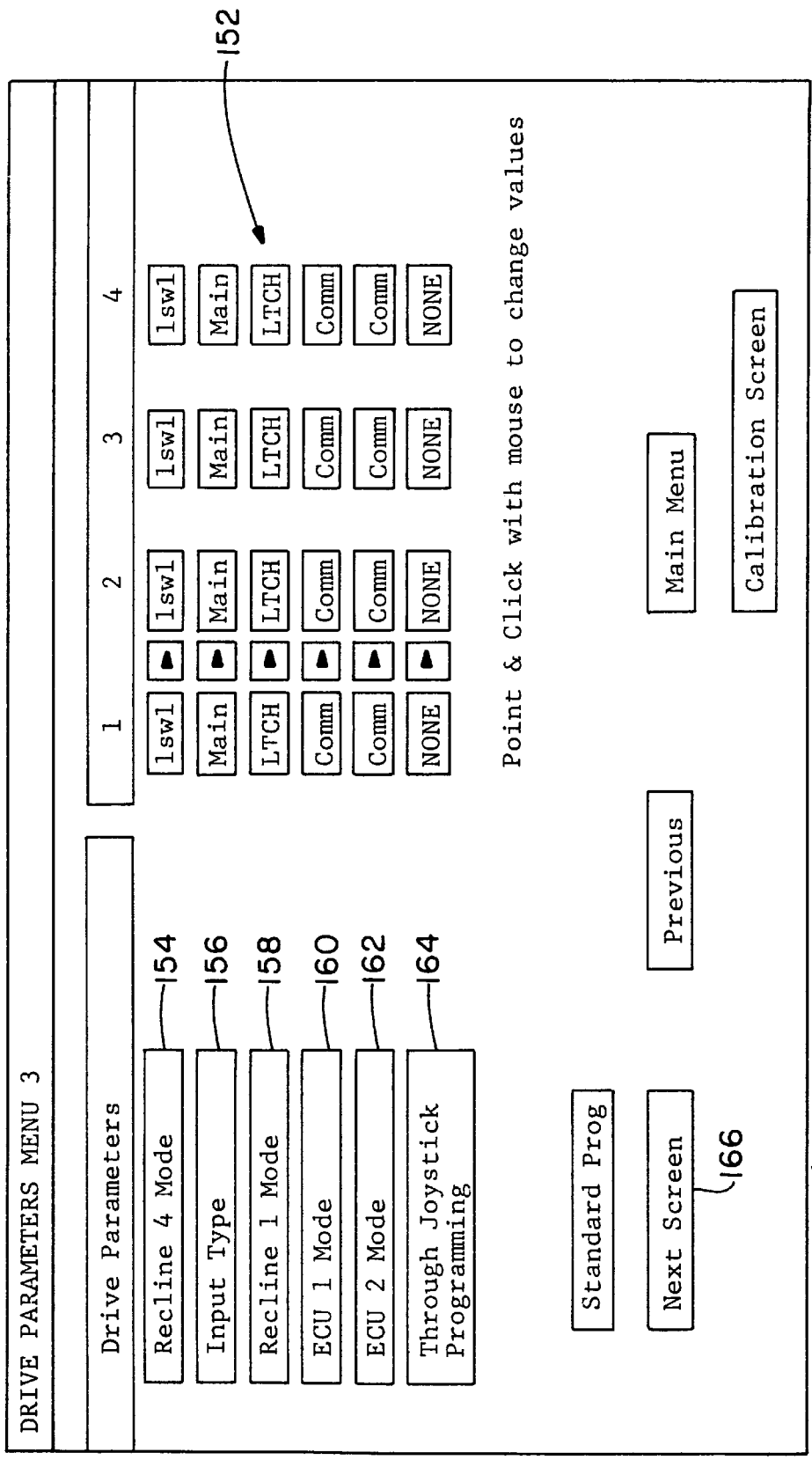
FIG. 10 is an exemplary third Drive Parameter display screen of the TDP system of FIG. 2.

A Next Screen button 148 advances the TDP system to the next display screen in sequential order, namely, a third Drive Parameter display screen 150 as shown in FIG. 10. The second Drive Parameter display screen 124 also includes a Standard Prog button to advance to a Standard Program screen, a Calibration Screen button to advance to the Calibration screen (FIG. 12), a Previous button to return to the first Drive Parameter display screen 86, and a Main Menu button to return to the Main display screen 56 (FIG. 6).

With reference to FIG. 10, the third Drive Parameter display screen 150 includes a menu 152 substantially similar to the menus 88 and 126 of display screens 86 and 124, respectively. A Recline 4 Mode Tilt/Recline Function parameter 154 is used when the wheelchair is configured with a Tilt/Recline module. There may be three operating modes in the Tilt/Recline mode, namely a Four Switch (4-SW) mode, a One Switch Momentary (1swM) mode, and a One Switch Latched (1swL) mode.

The 4-SW mode uses all four quadrants of the joystick. Each command is momentary (a command is active only as long as the joystick is displaced in that direction). The 1swM mode activates each quadrant individually. A Right command activates each command. The command is active only as long as the Right command is given. Sequencing to each function is done by through the Emergency Stop (Reset) switch. The 1swL mode activates each quadrant individually. A Right command activates each command. The first Right command activates the function. When the command is released, the function stays active. A second Right command deactivates the function. Sequencing to each function is done by the Emergency Stop (Reset) switch. The 1swL mode is especially useful with Sip & Puff users and when the command cannot be held for the time needed for the seating system to move to the required position.

An Input Type parameter 156 tells the control module 10 which joystick is to be used to drive the wheelchair when more than one drive control device is mounted on the wheelchair.

A Recline 1 Mode parameter 158 is also used when the wheelchair is configured with a Tilt/Recline module. The options for controlling the Tilt/Recline module through the joystick are: OFF disables joystick operation of the Tilt/Recline module for the drive. However, an independent or manual switch continues to function normally. MOM. MOTOR momentary motor control means that the up or down function is active only when the driver command is active. LATCHED changes the operation of the up and down functions so that they stay engaged until released by an opposite direction command. This feature is especially useful when operating a powered back recliner with a pneumatic switch and the user has difficulty keeping the relay engaged for the time required to position the chair back. The up function is activated by giving a forward or right command. The down function is activated by giving a left or reverse command.

An ECU1 (Environmental Control Unit) parameter 160 is used to select the performance of an optional environmental control card in a slot of an accessory output module (not shown). In OFF mode, environmental control outputs for the drive are disabled. In MOM. MOTOR mode, momentary motor control is used to control recliners, motors, or actuators on the wheelchair. ECU relays are closed only when the driver command is active, and only one relay is active at a time. In LATCHED mode, the operation of Forward and Reverse relays are changed so that they stay engaged until released by an opposite direction command. This feature is especially useful when operating a powered back recliner with a pneumatic switch and the user has difficulty keeping the relay engaged for the time required to position the chair back. Only the Forward and Reverse relays are latched. The Right and Left relays operate as momentary switches. In COMM mode, the relays respond very quickly as needed for use with computers and communications aids. Two relays are permitted to be closed at one time to allow use of the diagonal capability offered in many systems.

An ECU2 parameter 162 is used to select the performance of an environmental control card in a second slot of the accessory output module (not shown). The mode selections are the same as for ECU1.

A Through the Joystick Programming (TTJP) parameter 164 is a function which permits a user of the wheelchair to adjust function values of the drive programs through the driver input control and independent of a programming unit connected to the serial port 26 of the control module 10. The TTJP function can be given four values, namely, OFF, SOME, MORE, and ALL. With OFF, the TTJP function is disabled and a program switch on the joystick or LCD display will not function. With SOME, limited programming ability is allowed. Programming of the parameters displayed on the first Drive Parameter display screen 56 are enabled (FORWARD SPD, TURNING SPD, ACCELERATION, SENSITIVITY, BREAKING ADJ, TORQUE, and REVERSE SPD. With MORE, additional parameters are available for adjustment, namely, ENERGY SAVER, MOM/LATCHED, MOM MODE SEL, LATCHED TYPE, and MOM REVERSE. With ALL, the rest of the performance parameters are available for adjustment through the command module.

The TTJP mode is entered by activation of the Program switch. The LCD display will show the first function and the current value. The four joystick command quadrants function the same as four of the keys on the programming unit which may be directly coupled to the serial port 26, namely, an Up key indicates the Forward command, a Down key indicates the Reverse command, a Menu key indicates the Left command, and a Select key indicates the Right command. With a Menu icon visible, Forward or Reverse commands will scroll the display though the performance menu and show the value for each function. Giving a Right command will select the displayed function for adjustment. A Menu icon will disappear and an Adjust icon will be displayed. Adjustment of the function is performed giving Forward or Reverse commands which will increase or decease the value respectively. When the function is changed to its new desired value, a Left command will cause the Menu icon to be displayed. Saving the changes to the current drive program is performed by actuating the Program switch. Exiting TTJP mode without saving the changes is accomplished by moving the Power switch to the Off position or allowing 45 seconds to elapse without giving any joystick commands.

Figure 11:
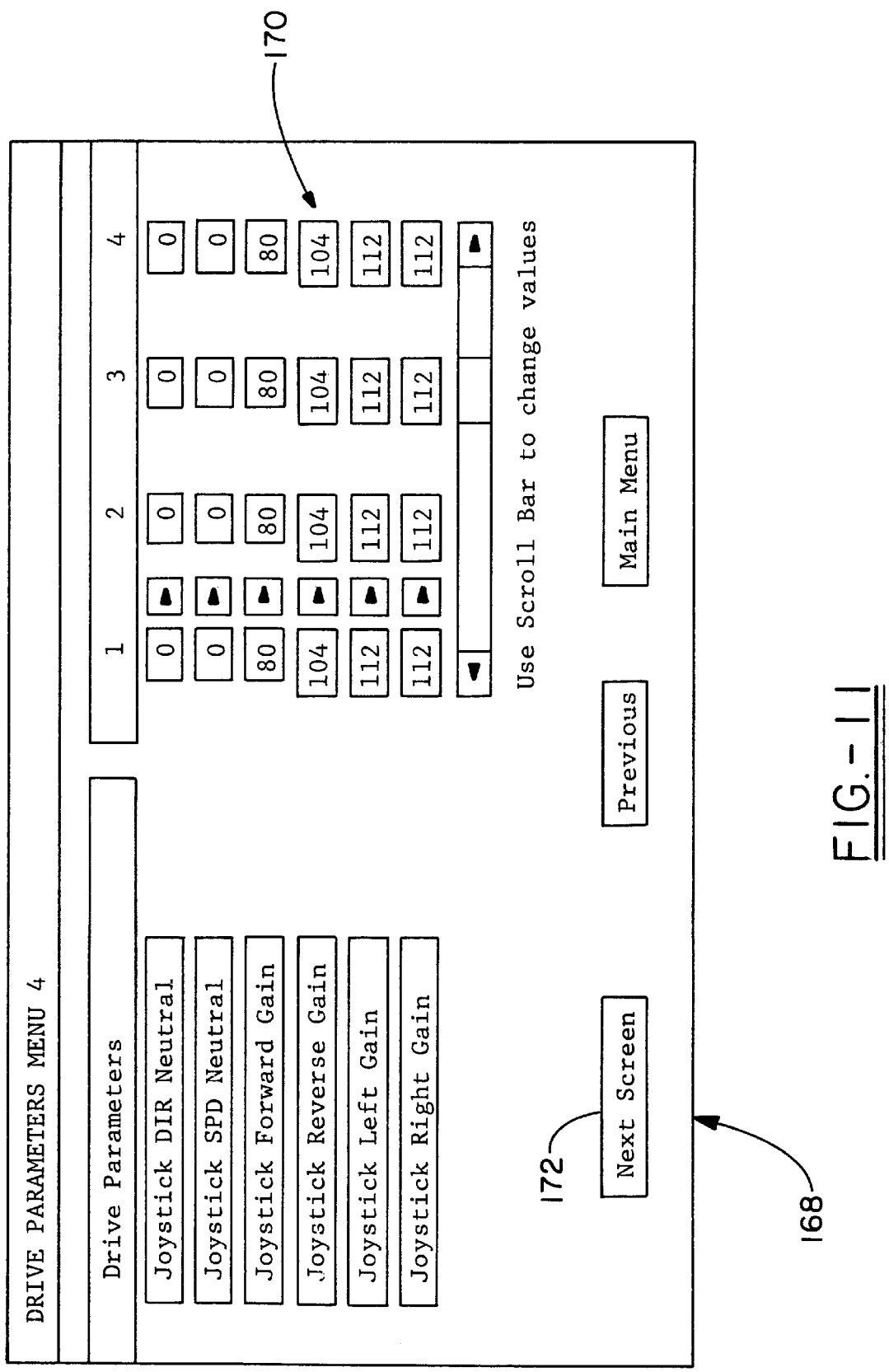
FIG. 11 is an exemplary fourth Drive Parameter display screen of the TDP system of FIG. 2.

A Next Screen button 166 advances the TDP system to the next display screen in sequential order, namely, a fourth Drive Parameter display screen 168 shown in FIG. 11. The third Drive Parameter display screen 150 also includes a Standard Prog button to advance to a Standard Program screen, a Calibration Screen button to advance to the Calibration screen (FIG. 12), a Previous button to return to the second Drive Parameter display screen 124, and a Main Menu button to return to the Main display screen 56 (FIG. 6).

With reference to FIG. 11, the fourth Drive Parameter display screen 168 includes a menu 170 substantially similar to the menus 88, 126, and 152. The fourth Drive Parameter display screen 168 displays values that are generated when a joystick is calibrated with a known Joystick Throw Function and a directly coupled programming unit. Though changes to these parameters can be made through the TDP system, it is easier and more beneficial to adjustment the parameters using a programming unit directly connected to the control module serial port 26. However, it is beneficial for a service technician using the TDP system to at least view the values in order to determine whether the joystick should be recalibrated.

Figure 12:
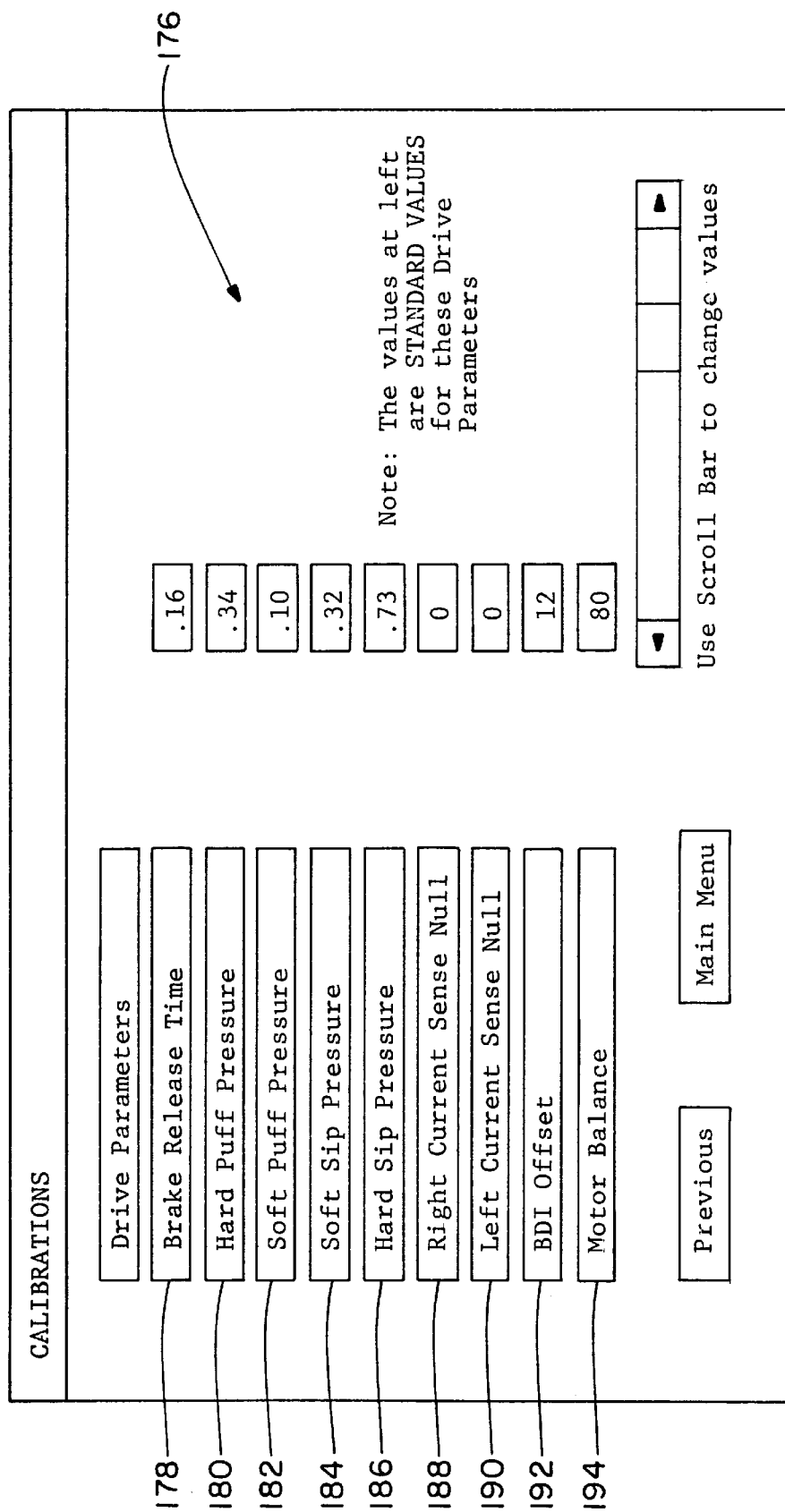
FIG. 12 is an exemplary Calibration display screen of the TDP system of FIG. 2.

A Next Screen button 172 advances the TDP system to the next display screen in sequential order, namely, a Calibration display screen 174 as shown in FIG. 12. The fourth Drive Parameter display screen 168 also includes a Previous button to return to the third Drive Parameter display screen 150, and a Main Menu button to return to the Main display screen 56 (FIG. 6).

With reference to FIG. 12, the Calibration display screen 174 includes a menu 176. A Brake Release Time parameter 178 determines the elapsed time for the motor locks to engage after the drive control is brought to neutral. The time is displayed in seconds.

Hard Puff Pressure, Soft Puff Pressure, Soft Sip Pressure, and Hard Sip Pressure parameters 180–186, respectively are pressures (or vacuum) set points for an optional Sip and Puff drive control. Higher values indicate more pressure or vacuum. A driving problem which can be corrected might be indicated by Sip or Puff pressures which are too close together. "Soft" pressures that are a factor of three (3) less than the respective "Hard" pressure is a good rule of thumb.

A Right Current Sense Null parameter 188 and a Left Current Sense Null parameter 190 are factory settings which require specialized test equipment to properly adjust. However, it is beneficial for a service technician using the TDP system to at least view the values of the Current Sense Null parameters 188, 190 in order to determine whether the particular control module 10 requires repair.

A Battery Discharge Indicator Offset parameter 192 permits a technician to adjust the calibration of a battery discharge indicator typically associated with the command module 20. The battery discharge indicator may be a bar graph or multiple LEDs which indicate a level of battery reserve power.

A Motor Balance parameter 194 is used to correct for veer when going straight on level ground. Veer is corrected by increasing or decreasing the voltage applied to the left motor as a percentage of that applied to the right motor. The Calibration display screen 174 includes a Previous button to return to the fourth Drive Parameter display screen 168, and a Main Menu button to return to the Main display screen 56 (FIG. 6).

Once control has returned to the Main display screen 56 (FIG. 6)from any of the previous display screens, any changes that were entered in the previous screens may be saved to the data file by selecting the Save Changes button 82. Selecting the Save Changes button 82 also initiates uploading the drive parameters 92 from the first through fourth Drive Parameter display screens 86, 124, 150, and 168, and the drive parameters from the Calibration display screen 174 to the control module 10.

In the embodiment being described, the upload is a two-step process wherein once the control module 10 has successfully received the drive parameters, an "OK" message is transmitted to the computer 12 and is displayed in the Current Status window 62 of the Main display screen 56. After the control module 10 successfully loads the drive parameters into the EEPROM 24, a "SAVED" message is transmitted to the computer 12 and displayed in the Current Status window 62. Reports may be printed out by selecting the Print Report button 84 from the Main display screen 56.

When the communication link between the control module 10 and the computer 12 is terminated, the "OH" light on the modem 13 goes out thus signaling to the user to disconnect the modem 13 from the wheelchair. It is contemplated that the service technician will then telephone the user to inform him/her of the results of the remote TDP session.

Therefore, the TDP system described above may be used to remotely maintain and/or troubleshoot a motorized wheelchair, thus reducing, expediting or in some cases eliminating altogether a service call. The TDP system may also be used to "repair" a motorized wheelchair when the batteries are discharged and only need recharging, when drive or performance parameters need to be reprogrammed (e.g. varied or adjusted), or when a connector associated with control module has become unplugged.

The invention has been described with reference to the preferred embodiment(s). Obviously, modifications and alterations will occur to others upon reading and understanding the preceding detailed description. It is intended that the invention be construed as including all such modifications and alterations insofar as they come within the scope of the appended claims of the equivalents thereof.

Having thus described the preferred embodiment(s), the invention is now claimed to be:

1. A method of remote communication between a remote data processing unit with an associated video monitor and a motorized wheelchair having an associated controller and an associated modem, said remote data processing unit and said controller each being capable of generating data, comprising the steps of using the modem to establish a data communications link between the controller and the remote data processing unit;

uploading first data from the controller across the data communications link to the remote data processing unit for display on the video monitor;

downloading second data from the remote data processing unit across the data communications link to the controller; and terminating the data communications link after the controller acknowledges receipt of the second data.

2. The method of claim 1, further including the step of:

modifying at least a portion of the first data to generate the second data.

3. The method of claim 1, wherein the downloading second data step includes the step of:

storing the second data in a memory associated with the controller.

4. The method of claim 1, wherein the uploading first data includes the step of:

reading the first data from a memory associated with the controller.

5. The method of claim 1, wherein the uploading first data step includes the step of:

reading at least one of error code data and first data from a memory associated with the controller.

6. The method of claim 5 wherein said first data and said second data are drive parameter data, further including the steps of:

modifying at least a portion of the first drive parameter data to generate second drive parameter data; and downloading the second drive parameter data from the remote data processing unit across the data communications link to the controller.

7. The method of claim 6, further including the step of:

storing at least one of the error code data, first drive parameter data, and second drive parameter data in a database record.

8. The method of claim 6, further including the step of:

printing out at least one of the error code data, first drive parameter data, and second drive parameter data on a printer.

9. A wheelchair diagnostic system, comprising:

a data communications network;

a motorized wheelchair having a controller associated therewith;

a modem coupled between the controller and the data communications network;

a remote data processing unit coupled to the data communications network; and a diagnostics tool executing on the remote data processing unit which facilitates communicating with the controller across the data communications network, the diagnostics tool including computer readable code means for causing first data from the controller to be downloaded across the data communications network to the remote data processing unit.

10. The wheelchair diagnostic system of claim 9, further including:

computer readable code means for modifying the first data to generate second data; and computer readable code means for uploading the second data across the data communications network to the controller for storage in a controller memory.

11. The wheelchair diagnostic system of claim 9, wherein the first data includes at least one of error code data and drive parameter data.

12. A program product comprising:

a computer usable medium having computer readable program code means embodied therein for causing a computer to display first data received across a data communication network from a controller associated with a wheelchair, the computer readable program code means in the article of manufacture comprising:

computer readable program code means for causing the computer to effect downloading of the first data from a memory associated with the controller; and computer readable program code means for causing the computer to effect displaying the first data on a video monitor, the first data including at least one of error code data and drive parameter data.

13. The program product of claim 12, further including computer readable program code means for causing the computer to effect modifying the first data to generate second data.

14. The program product of claim 12, further including computer readable program code means for causing the computer to effect uploading the second data across the data communications network to the memory associated with the controller.

15. The program product of claim 12, further including computer readable program code means for causing the computer to effect storing at least one of the first data and the second data in a database record.

16. The program product of claim 12, further including computer readable program code means for causing the computer to effect printing at least one of the first data and the second data on a printer.

* * * * *